US010258017B2

(12) United States Patent
Nelles et al.

(10) Patent No.: US 10,258,017 B2
(45) Date of Patent: Apr. 16, 2019

(54) CONTINUOUS COOKER STRETCHER AND METHODS OF USE THEREOF

(71) Applicant: Tetra Laval Holdings & Finance S.A., Pully (CH)

(72) Inventors: Peter F. Nelles, Blue Mounds, WI (US); Gary L. Nesheim, Delafield, WI (US); Grant L. Nesheim, Mazomanie, WI (US)

(73) Assignee: Tetra Laval Holdings & Finance S.A., Pully (CH)

( * ) Notice: Subject to any disclaimer, the term of this patent is extended or adjusted under 35 U.S.C. 154(b) by 781 days.

(21) Appl. No.: 14/692,445

(22) Filed: Apr. 21, 2015

(65) Prior Publication Data
US 2015/0296739 A1 Oct. 22, 2015

Related U.S. Application Data

(60) Provisional application No. 61/982,032, filed on Apr. 21, 2014.

(51) Int. Cl.
*A01J 25/00* (2006.01)
*A23C 19/068* (2006.01)
*B01F 15/06* (2006.01)
*B01F 7/08* (2006.01)

(52) U.S. Cl.
CPC ......... *A01J 25/008* (2013.01); *A23C 19/0684* (2013.01); *B01F 7/082* (2013.01); *B01F 15/068* (2013.01); *B01F 2015/062* (2013.01)

(58) Field of Classification Search
CPC .. B01F 7/082; B01F 15/068; B01F 2015/062; A01J 25/008; A23C 19/0684
See application file for complete search history.

(56) References Cited

U.S. PATENT DOCUMENTS

| 140,527 | A | | 7/1873 | Munson, Jr. |
| 923,047 | A | | 5/1909 | Hanna |
| 1,639,828 | A | | 8/1927 | Wheeler et al. |
| 1,713,537 | A | | 5/1929 | Kux |
| 1,796,445 | A | | 3/1931 | Doering et al. |
| 1,861,721 | A | | 6/1932 | Murray |
| 2,302,169 | A | * | 11/1942 | Baker ............... A23L 3/361 34/586 |
| 2,321,185 | A | | 6/1943 | Christian |
| 2,733,148 | A | | 1/1956 | Russo |

(Continued)

FOREIGN PATENT DOCUMENTS

| DE | 3037599 A1 * 5/1982 ............ B01F 15/068 |
| EP | 0124163     11/1984 |

(Continued)

OTHER PUBLICATIONS

International Serach Report and Written Opinion for international application No. PCT/US2015/026902 dated Jun. 29, 2015, 15 pages.

*Primary Examiner* — Steven N Leff
(74) *Attorney, Agent, or Firm* — Knobbe, Martens, Olson & Bear, LLP

(57) ABSTRACT

The disclosure relates to methods and apparatuses for the production of cheese. In one embodiment, the disclosure relates to methods and apparatuses for making pasta filata cheese. In one embodiment, a continuous cooker stretcher is used for the production of pasta filata cheese.

9 Claims, 2 Drawing Sheets

(56) References Cited

U.S. PATENT DOCUMENTS

| | | |
|---|---|---|
| 2,781,269 A | 2/1957 | Harper et al. |
| 2,840,909 A | 7/1958 | Dzenis |
| 2,883,163 A | 4/1959 | Peder |
| 2,908,575 A | 10/1959 | Spiess, Jr. et al. |
| 3,310,836 A | 3/1967 | Nichols |
| 3,394,011 A | 7/1968 | Richardson et al. |
| 3,529,661 A | 9/1970 | Yousch |
| 3,529,939 A | 9/1970 | Mason |
| 3,548,926 A | 12/1970 | Archer |
| 3,616,747 A | 11/1971 | Lapeyre |
| 3,637,069 A | 1/1972 | Christian et al. |
| 3,688,837 A | 9/1972 | Ocker |
| 3,713,220 A | 1/1973 | Kielsmeier et al. |
| 3,899,596 A | 8/1975 | Stenee |
| 3,961,077 A | 6/1976 | Kielsmeier |
| 3,970,113 A | 7/1976 | Guttinger et al. |
| 4,039,691 A | 8/1977 | Hildebolt |
| 4,091,721 A | 5/1978 | Cosmi |
| 4,112,131 A | 9/1978 | Bosy et al. |
| 4,118,164 A | 10/1978 | Wenger et al. |
| 4,541,329 A | 9/1985 | Mongiello |
| 4,592,274 A | 6/1986 | Tomatis |
| 4,622,228 A | 11/1986 | Ikeuchi et al. |
| 4,723,901 A | 2/1988 | Sarumaru |
| 4,848,219 A | 7/1989 | Aldrovandi |
| 5,120,559 A | 6/1992 | Rizvi et al. |
| 5,165,948 A | 11/1992 | Thomas |
| 5,350,595 A | 9/1994 | Hockenberry et al. |
| 5,358,730 A | 10/1994 | Dame-Cahagne et al. |
| 5,547,277 A | 8/1996 | Caspelherr et al. |
| 5,595,775 A | 1/1997 | Tishel |
| 5,697,291 A | 12/1997 | Burgener et al. |
| 5,750,177 A | 5/1998 | Yee et al. |
| 5,792,500 A | 8/1998 | Housset et al. |
| 5,802,961 A * | 9/1998 | Hay .............. A23B 7/0053 165/111 |
| 5,906,853 A | 5/1999 | Smith |
| 5,942,263 A | 8/1999 | Chen et al. |
| 5,945,022 A | 8/1999 | Volpe et al. |
| 5,952,030 A | 9/1999 | Nelles et al. |
| 5,967,026 A | 10/1999 | Nelles et al. |
| 5,996,475 A | 12/1999 | Smith |
| 6,086,926 A | 7/2000 | Bruce et al. |
| 6,120,809 A | 9/2000 | Rhodes |
| 6,180,153 B1 | 1/2001 | Palus et al. |
| RE37,264 E | 7/2001 | Chen et al. |
| 6,319,526 B1 * | 11/2001 | Dahlstrom .......... A23C 19/063 426/36 |
| 6,524,632 B2 | 2/2003 | Kartchner |
| 6,780,445 B1 | 8/2004 | Rhodes |
| 6,989,170 B2 | 1/2006 | Konanayakam et al. |
| 7,291,356 B2 | 11/2007 | Merrill et al. |
| 7,521,076 B1 | 4/2009 | Wenger et al. |
| 7,550,279 B2 | 6/2009 | Nickel |
| 7,579,033 B2 | 8/2009 | Merril et al. |
| 7,582,323 B2 | 9/2009 | Aird et al. |
| 7,585,537 B2 | 9/2009 | Merril et al. |
| 7,651,715 B2 | 1/2010 | Merril et al. |
| 7,666,458 B2 | 2/2010 | Merril et al. |
| 7,713,564 B2 | 5/2010 | Merril et al. |
| 7,955,814 B2 | 6/2011 | Kekreij et al. |
| 7,976,886 B2 | 7/2011 | Merril et al. |
| 7,987,774 B2 | 8/2011 | Wenger et al. |
| 8,021,704 B2 | 9/2011 | Merril et al. |
| 8,221,816 B1 | 7/2012 | Leffelman |
| 8,241,691 B2 | 8/2012 | Merril et al. |
| 8,603,554 B2 | 12/2013 | Merril et al. |
| 8,613,970 B2 | 12/2013 | Merril et al. |
| 8,628,810 B2 | 1/2014 | Barbano et al. |
| 8,932,657 B2 | 1/2015 | Nelles et al. |
| 2005/0249853 A1 | 11/2005 | Merrill et al. |
| 2008/0089987 A1 | 4/2008 | Horn |
| 2008/0131557 A1 | 6/2008 | Isse et al. |
| 2010/0051233 A1 | 3/2010 | Whitney et al. |
| 2010/0209584 A1 | 8/2010 | Weibel |
| 2010/0239713 A1 | 9/2010 | Merrill et al. |
| 2011/0091627 A1 | 4/2011 | Wenger et al. |
| 2012/0097048 A1 | 4/2012 | Tomatis |
| 2014/0027095 A1 | 1/2014 | Warchol et al. |
| 2014/0037812 A1 | 2/2014 | Oxboll et al. |
| 2015/0147443 A1 | 5/2015 | Nelles et al. |
| 2016/0243727 A1 | 8/2016 | Nelles et al. |

FOREIGN PATENT DOCUMENTS

| | | |
|---|---|---|
| EP | 0186795 | 7/1986 |
| JP | 07143844 | 6/1995 |
| WO | WO 94/09615 | 5/1994 |
| WO | WO 99/53749 | 10/1999 |

* cited by examiner

CONTINUOUS COOKER STRETCHER AND METHODS OF USE THEREOF

CROSS-REFERENCE TO RELATED APPLICATIONS

This application claims priority to and is a non-provisional application of U.S. patent application Ser. No. 61/982,032 filed Apr. 21, 2014, which is incorporated herein by reference in its entirety.

FIELD

The disclosure relates to methods and apparatuses for the production of cheese. In one embodiment, the disclosure relates to methods and apparatuses for making pasta filata cheese. In one embodiment, the disclosure relates to a continuous cooker stretcher and methods of use thereof.

BACKGROUND

Recently there has been an increase in the demand for cheeses that have widely differing performance characteristics. This particular demand is driven in part by the increasing variety of prepared foods in which such cheeses are included. In fact, there often is a need for different performance qualities even for foods of the same general type because of the different ways cheeses are utilized or because the cheese is exposed to differing cooking environments or conditions. Pizzas illustrate this point well because there are so many different types of pizzas. Pizzas, for example, have widely differing crusts, including thick, thin, or somewhere in between. The cheese can also be exposed or wrapped in the edge of the crust. Furthermore, the crust may be completely uncooked or it may be part-baked before being put in the oven with the cheese. Each of these variables potentially impacts the composition of the cheese required to provide satisfactory performance.

There are a variety of challenges to providing cheeses that have a composition which satisfies the desired performance characteristics and nutritional qualities. For instance, it can be difficult to obtain the desired concentration level of some ingredients in a cheese. Another problem is developing a process that activates the latent functional properties of certain ingredients. Another problem is that many methods for preparing cheese involve the loss of significant quantities of some cheese components during processing. This can occur, for instance, when such cheeses undergo the heating and stretching process of the pasta filata process. Often the heating is conducted in heated water, which can remove significant amounts of cheese ingredients.

In general terms, it is possible to state that all pasta filata cheeses are obtained by a working scheme essentially comprising the following steps: milk treatment, acidification (by adding ferments or organic acids such as citric acid), addition of rennet, curdling, cutting of the curd, extraction of whey, kneading and stretching in hot water ("filatura"), shaping, cooling and stiffening, packaging with or without a conservation (preserving) liquid of the final product. Therefore, differences that can be found in the different preparations are due to the kind of milk used and to the variation of technology adopted, and the products thus obtained are quite similar to one another.

For the cooker-stretcher step for pasta filata, a circulating hot water system is usually used. This heats the mass of curd to the target temperature (usually between 125 and 142 F). In this step, a significant amount of cheese solids may be lost to the cooker water. Significant amount of resources are dedicated for the retention of the solids and the disposal of liquids.

Pasta filata cheese needs to mature for a period of time before it is ready to exhibit the target functionality. But after a period of time, the product loses its functionality, thus the cheese has a performance window. To reduce inventory, there is always a need to have faster maturation.

In view of the high demand for cheese and the foregoing shortcomings associated with some existing methods and apparatuses, there remains a need for additional methods and apparatuses for preparing cheeses of these types.

BRIEF SUMMARY

The disclosure relates to methods and apparatuses of making a pasta filata cheese. In one embodiment, the disclosure relates to a continuous cooker stretcher comprising a chamber comprising a heated auger. In one embodiment, the auger is a solid flight auger with a hollow tube surrounding the flight of the auger. In one embodiment, the flights are solid and are not hollow.

In yet another embodiment, the continuous cooker stretcher comprises a chamber with a heated auger located therein and a heated jacket surrounding the chamber, wherein the heat source for the auger and the heat source for the chamber are separate and distinct and operate independent of one another. In one embodiment, the heat to the auger is supplied by a first heated fluid. In still another embodiment, the heat to the jacket is provided by a second heated fluid.

In yet another embodiment, the continuous cooker stretcher comprises a chamber with an auger located therein and a jacket surrounding the chamber, wherein a first heated fluid from a first reservoir is supplied to the auger; and a second heated fluid from a second reservoir is supplied to the jacket, wherein the first and second reservoirs are separate and distinct and operate independent of one another.

In yet another embodiment, the disclosure relates to an apparatus for making pasta filata cheese comprising a chamber with a flighted auger located therein, wherein the auger has a hollow shaft and a hollow fluid chamber coupled to solid flights, a jacket surrounding the chamber, a first reservoir for providing a first heated fluid to the auger; and a second reservoir for providing a second heated fluid to the jacket; wherein the first and second reservoirs are distinct reservoirs.

In still another embodiment, the disclosure relates to a cooker comprising a chamber with an auger located therein; steam injectors for supplying steam to the interior of the chamber; a jacket surrounding the chamber; a first reservoir for providing a first heated fluid to the auger; and a second reservoir for supplying a second heated fluid to the jacket, wherein the first and second reservoirs are distinct reservoirs.

In still another embodiment, the disclosure relates to a cooker comprising a chamber with an auger located therein; a jacket surrounding the chamber; a first reservoir for providing a first heated fluid to the auger; and a second reservoir for supplying a second heated fluid to the jacket, wherein the first and second reservoirs are distinct reservoirs.

In one embodiment, the disclosure relates to a method for making pasta filata cheese comprising: (a) passing a first heated fluid from a first reservoir through a pair of auger members located in a chamber; (b) passing a second heated fluid from a second reservoir through a jacket surrounding the chamber, wherein the first and second reservoirs are distinct reservoirs; and (c) rotating the pair of auger members to knead and melt cheese curd in the interior of the chamber.

In another embodiment, the disclosure relates to a method for making pasta filata cheese comprising: (a) providing a jacketed chamber having inlet and outlet openings and a pair of auger members located between the inlet and outlet openings; (b) passing a first heated fluid from a first reservoir through the augers and a second heated fluid from a second reservoir through the jacket surrounding the chamber; wherein the first and second reservoirs are distinct reservoirs; (c) supplying cheese curd to the interior of the jacketed chamber via the inlet opening; and (d) rotating the pair of auger members to knead and melt the cheese curd.

In one embodiment, the disclosure relates to a method comprising: (a) supplying cheese curd to an interior of a chamber with an auger located therein and a jacket surrounding the chamber, wherein a first heated fluid from a first reservoir passes through said auger and a second heated fluid from a second reservoir passes through said jacket. In one embodiment, the temperature of the first fluid in the jacket and the second fluid in the augers differs.

In one embodiment, the disclosure relates to a method comprising: (a) supplying cheese curd to an interior of a jacketed chamber with an auger located therein; (b) passing a first heated fluid from a first reservoir though the auger and a second heated fluid from a second reservoir through the jacket; and (c) rotating the pair of auger members to knead and melt the cheese curd. In one embodiment, the first and second reservoirs are independent and distinct. In yet another embodiment, the temperature of the first fluid and the second fluid are different.

In one embodiment, the disclosure relates to a method comprising: (a) providing a chamber having an inlet and outlet openings and an auger located between the inlet and outlet openings, wherein a jacket surrounds the chamber; (b) passing a first heated fluid from a first reservoir through the auger and a second heated fluid from a second reservoir through the jacket surrounding the chamber; (c) supplying cheese curd to the interior of the jacketed chamber via the inlet opening; and (d) rotating the pair of auger members to knead and melt the cheese curd. In another embodiment, the method comprises removing the low moisture filata cheese from the jacketed chamber via the outlet opening.

In one embodiment, the disclosure relates to a method comprising: (a) providing a chamber having an inlet and outlet openings and a pair of solid flight auger members located between the inlet and outlet openings, wherein a jacket surrounds the chamber and further wherein a hollow tube is coupled to the flight of the augers; (b) passing a first heated fluid through a hollow shaft of the auger and the hollow tube coupled to the flight of the augers; (c) passing a second heated fluid through the jacket of the chamber; (d) supplying cheese curd to the interior of the jacketed chamber via the inlet opening therein; and (e) rotating the pair of auger members to knead and melt the cheese curd. In another embodiment, the method comprises removing the low moisture filata cheese from the jacketed chamber via the outlet opening.

In another embodiment, the temperature of the first fluid and the second fluid are different. In still another embodiment, the first and second fluids are separate fluids; there is no contact between the first and second fluids.

In yet another embodiment, the first fluid is contained in a first reservoir and the second fluid is contained in a second reservoir, wherein the first and second reservoirs are separate and distinct from one another.

An advantage of the methods and systems disclosed herein is that the methods and systems allow for independent temperature control of a heated fluid in a jacket surrounding the chamber and a heated fluid that passes through the auger.

An advantage of the methods and systems disclosed herein is that the methods and systems allow for the temperature of the fluid in the jacket surrounding the chamber and the temperature of the fluid in the augers to be different.

An advantage of the methods and systems disclosed herein is that the methods and systems eliminate cook water.

An advantage of the methods and systems disclosed herein is that they provide for a high capacity dry cooker.

An advantage of the methods and systems disclosed herein is that they provide for non-batch continuous production.

An advantage of the methods and systems disclosed herein is that they provide for linear power systems, which allows for predictable, precise temperature control.

An advantage of the methods and systems disclosed herein is that they provide for instant on/off heat control.

An advantage of the methods and systems disclosed herein is that they provide for no pre-heating.

An advantage of the methods and systems disclosed herein is that they provide for rapid temperature adjustment.

An advantage of the methods and systems disclosed herein is that they provide for pre- and post-cooking ingredient addition.

An advantage of the methods and systems disclosed herein is that they provide for reduced fat loss, increasing yield, and decreasing wastewater.

DETAILED DESCRIPTION

Definitions

Figure 1:
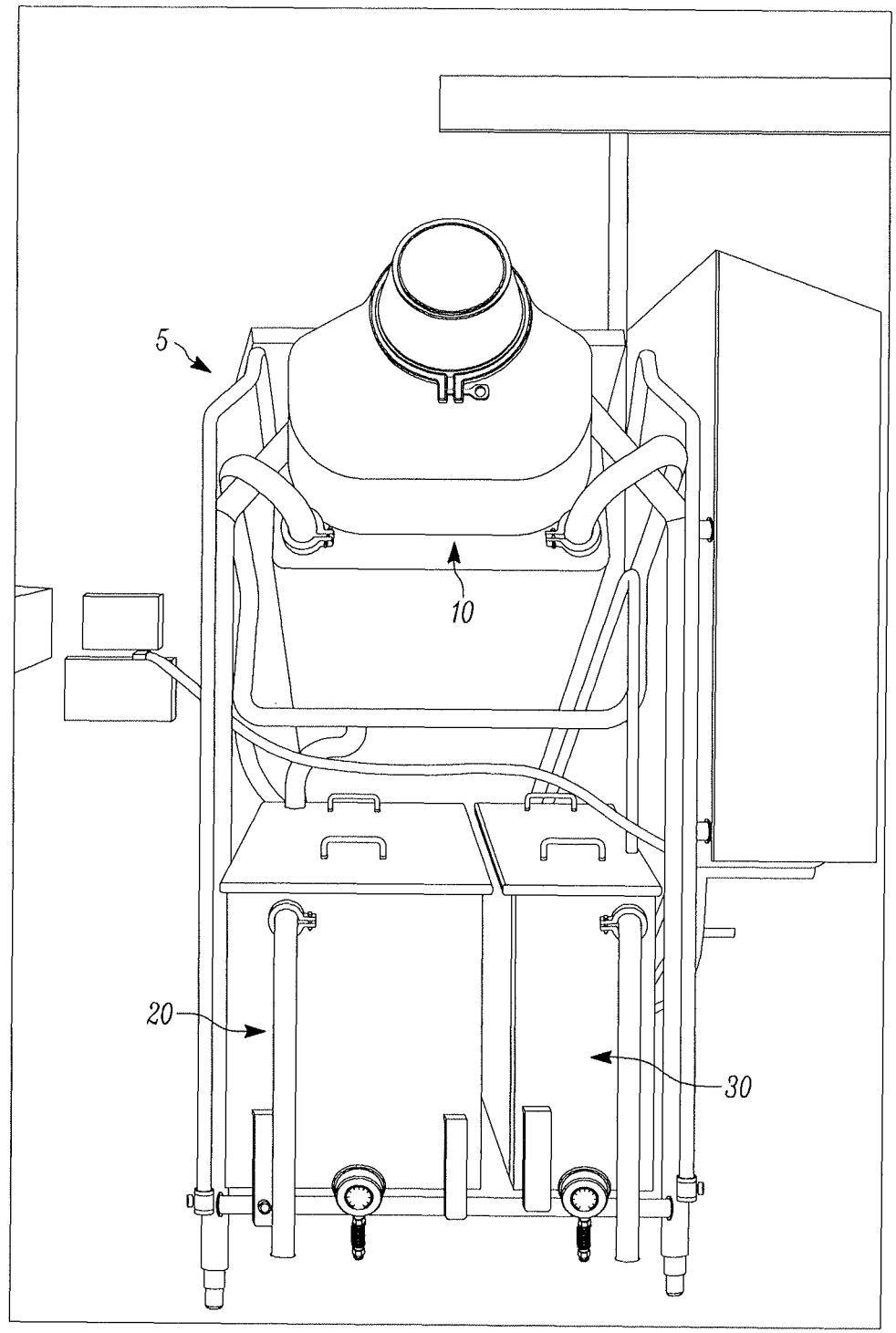
FIG. 1 is a representative depiction of a continuous cooker stretcher with a first fluid reservoir for supplying a first fluid to the augers and a second fluid reservoir for supplying a second fluid to the jacket surrounding the chamber.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, relative amounts of components in a mixture, and various temperature and other parameter ranges recited in the methods.

As used herein, "about" refers to up to plus or minus 10% of the indicated number. For example, "about 25° F." refers to 22.5° F. to 27.5° F. In some embodiments, "about" refers to up to plus or minus 9, 8, 7, 6, 5, 4, 3, 2, or 1% of the indicated number. When only integer values are possible, "about" refers to up to plus or minus 10% rounded to the nearest integer number. All numbers and numerical ranges recited herein are intended to include the term "about." Thus, even if the number or numerical range is not preceded by the term "about," the number or numerical range are intended to cover plus or minus 10% of the indicated number. For example, a recited temperature range of "10 to 20" is intended to include "9 to 22."

As used herein, "auger stretching" refers to a continuous stretching and mixing of cheese and ingredients with low, medium, or high moisture content. The auger pitch, overlap and clearances are key to the performance and capacity of the unit.

As used herein, Clean-In-Place Section Belt Cleaning refers to the belt that will be continuously water rinsed during the production process to restrict the reheating of cheese particles that cling to the belt. In one embodiment, the cabinet or component containing the continuous cooker stretcher source can be manually cleaned.

As used herein, the Clean-in-Place Cabinet Cleaning refers to a cabinet that will be efficiently and automatically cleaned via a CIP wash and rinse cycle provided by a CIP system.

As used herein, a "cyclone" is an apparatus for separation of cheese curd in an airstream by the use of centrifugal forces. Cheese curd drops out of the bottom and air is evacuated out the top.

As used herein, a "curd mill" may reduce the size of the curd to a uniform size necessary for providing even heating. In one embodiment, a curd mill may be used while in other embodiments, a curd mill may not be required.

As used herein, the term "fluid" includes both the liquid and gas phases.

As used herein, the term "fluid chamber" refers to any apparatus, container, tube, tube-like structure, molding, cavity, or crevice that confines a fluid within a particular location. The fluid can circulate through the fluid chamber.

As used herein, "fluid dispensing" refers to positive displacement pump heads coupled with a stepping motor drive or other positive displacement or metering device allowing the system to have highly precise flow rates of liquids and slurry delivery.

As used herein, "heating" refers to the process of increasing the temperature of a product, including but not limited to a dairy product and cheese curd. In one embodiment, heating results in cooking the product to the final state. In another embodiment, heating results in transforming the product from a first uncooked state to a second uncooked state.

As used herein, an "ingredient dispenser" feeds dry ingredients at a precise and adjustable flow rate. The dispenser utilizes a positive driven internal auger to gently fluidize ingredients without breaking down the base composition.

As used herein, the term "input material" includes but is not limited to cheese precursor, curd precursor, cream, and cheese curd.

As used herein, the term "housing" refers to an enclosed space or compartment. In one embodiment, the housing can be within a larger apparatus. The terms housing and chamber can be used interchangeably unless explicitly stated otherwise.

As used herein, the term "manipulating" refers to transforming a product from a first state to a second state. In one embodiment, manipulating includes, but is not limited to shaping, molding, sizing, cutting, milling, grinding, leveling and augering a product. In yet another embodiment, manipulating includes transforming a product from a first state to a second state, wherein the second state has a more uniform shape, size, volume, density, mass or weight as compared to the first state.

A "soft or firm/semi-hard cheese" as used herein generally includes cheeses that have a percentage moisture on a fat free basis (MFFB) of about 54% or more, by weight. The term includes firm/semi-hard cheeses that have a MFFB, for example, of about 54% to about 80%, by wt., and cheeses with a MFFB, for example, of about 58% to about 75%, by wt. The term may also include soft cheeses with a MFFB of greater than about 60%, by wt. The term encompasses a variety of well-known cheeses including, but not limited to, Colby, Havarti, Monterey Jack, provolone, Gorgonzola, Gouda, Cheshire and Muenster, which are examples of "firm/semi-hard cheeses." Also included in the term are popular "soft cheeses" such as Mozzarella, cream cheese, and cottage cheese. A variety of mozzarella cheeses are included by the term; these can be in the soft or firm/semi-hard category, or in between the two, depending upon their moisture content. Standard mozzarella, for example, is a soft cheese, part-skim mozzarella is between soft and firm/semi-hard, and low-moisture mozzarella and low-moisture part-skim mozzarella are both designated as firm/semi-hard cheeses. The term soft or firm/semi-hard as used herein includes cheeses meeting the CODEX definition of a soft or firm/semi-hard cheese. The term also includes soft or firm/semi-hard cheeses as defined by other local, regional, national or international agencies or organizations.

Cheeses within the "soft or firm/semi-hard" category as defined herein can be prepared using a variety of methods, including conventional methods, as well as by "alternative make" provisions. The term includes, for instance, cheeses made by a process in which a cheese curd is heated and kneaded to improve the stretchability or stringiness of the final cheese, provided the cheese falls within the MFFB parameters set above. This process and related processes are sometimes referred to as a pasta filata process of manufacturing. Cheeses made by this process are known under a variety of names, including mozzarella, pasta filata, provolone, Mexican style, scamorze, and pizza cheese. Cheeses made by alternative make procedures are prepared by alternative methods of making cheeses, so long as the procedure produces a cheese having the same physical and chemical properties of the type of cheese made by a specified process (e.g., a process specified by a regulatory agency) and falls within the MFFB parameters set forth above.

The "soft" and "firm/semi-hard" cheeses that are provided include standard and non-standard cheeses and cheese products having the foregoing moisture characteristics. Standard cheeses are those that satisfy the standards as set forth by a regulatory body with respect to a particular type of cheese. A non-standard cheese is one whose composition does not meet the standard. A soft or firm/semi-hard cheese can also be a processed cheese. A soft or firm/semi-hard cheese can also be ripened or unripened.

"Mozzarella" cheese has a minimum milkfat content of 45% by weight of the solids and a moisture content of more than 52% but not more than 60% by weight. "Low-moisture mozzarella" cheeses have a minimum milkfat content of 45% by weight of the solids and the moisture content is more than 45% but not more than 52% by weight. "Part-skim mozzarella" has a moisture content of more than 52% but not more than 60% by weight, and a milk fat content that is less than 45% but not less than 30% calculated on the solids basis. "Low-moisture part-skim" mozzarella has a moisture content of more than 45% but not more than 52% by weight and a milkfat content, calculated on the solids basis, of less than 45% but not less than 30%. Further details regarding these various mozzarella cheeses is provided by 21 C.F.R. §§ 1.33.155-133.158.

The term "cheese precursor" as used herein broadly refers to any ingredient that is used to prepare a cheese curd, mixtures of such ingredients and subsequent processed forms of the cheese curd other than the final cheese product. Examples of cheese precursors that are ingredients include, but are not limited to, unpasteurized milk (sometimes referred to in the industry as "raw milk"), the growth medium and bacteria used in the cheese making process (sometimes referred to in the industry as "starter"), and cream. Mixtures of such ingredients are also included. One specific example of such mixtures is "vat liquid," which is a term used to refer to a combination of pasteurized milk, starter and cream. The term also includes coagulum, cheese curd, and processed cheese curd, and whey.

The term "cream" means the liquid milk product high in fat separated from milk which may have been adjusted by adding thereto: milk, concentrated milk, dry whole milk, skim milk, concentrated skim milk, nonfat dry milk or other GRAS ingredients. "Whey cream" is the liquid milk product high in fat separated from whey (cheese, casein, or other), which may have been adjusted by adding thereto: whey, concentrated whey, dry whey, or other GRAS ingredients. "Pro-cream" is the liquid milk product high in fat collected as retentate from a whey filtration process such as microfiltration which may have been adjusted by adding thereto: whey, concentrated whey, dry whey, or other GRAS ingredients.

The term "curd precursor" refers to any soft or firm/semi-hard cheese ingredient, mixture or composition that exists or is formed prior to formation of the cheese curd. The term thus includes, for example, raw milk, milk powder, milk concentrate, skim milk concentrate, starter, cream, cheese vat liquids and coagulum.

The methods and apparatuses disclosed herein are directed toward pasta filata cheese. The principal varieties of pasta filata cheeses are: Caciocavallo, Provolone, Provolette, Pizza Cheese, Mozzarella, Provole, Scamorze, and Provatura. The well-known example of pasta filata-type of cheese is mozzarella. In the U.S., the standards of identity of the code of federal regulations subdivides mozzarella cheeses into: "Mozzarella", "Low Moisture Mozzarella", "Part Skim Mozzarella" and "Low Moisture Part Skim Mozzarella."

I. Continuous Cooker Stretcher

A. Two Independent Heat Sources

In one embodiment, the continuous cooker stretcher comprises at least two independent heat sources that aid in cooking cheese: (1) a chamber with an auger with a first heated fluid from a first reservoir passing through said auger; and (2) a jacket with a second heated fluid from a second reservoir surrounding a chamber or vessel, wherein the chamber or vessel contains cheese. In one embodiment, the first and second fluids are water. In still another embodiment, the first and second reservoirs are separate from one another.

In one embodiment, the continuous cooker stretcher comprises a chamber or vessel with an auger located therein, wherein a first heated fluid from a first reservoir passes through the auger, and a jacket surrounding the chamber, wherein a second heated fluid from a second reservoir passes through the jacket. The first reservoir and the second reservoir are distinct reservoirs, operating independent of one another.

In one embodiment, the continuous cooker stretcher comprises a chamber or vessel with an auger located therein and a jacket surrounding the chamber, wherein a first heated fluid from a first reservoir passes through said auger, and a second heated fluid from a second reservoir passes through said jacket, and further wherein the first and second reservoirs are distinct reservoirs.

In one embodiment, the continuous cooker stretcher comprises a chamber or vessel with a flighted auger located therein and a jacket surrounding the chamber, wherein a first heated fluid from a first reservoir passes through a hollow shaft of said auger and a hollow tube coupled to solid flights of the auger, and a second heated fluid from a second reservoir passes through said jacket, and further wherein the first and second reservoirs are distinct reservoirs. In an embodiment, the hollow tube is welded to the solid flights of the auger.

In one embodiment, the continuous cooker stretcher comprises a chamber or vessel with a heated auger located within said chamber and a heated jacket surrounding the chamber. The heated auger and the heated jacket surrounding the chamber operate with independent temperature control in a non-contact manner. A first heated fluid passes through said auger to heat said auger and a second heated fluid passes through the jacket to heat said jacket. The fluid supplied to the auger and the jacket each have separate and distinct fluid reservoirs.

In one embodiment, the continuous cooker stretcher comprises a chamber with a heated solid flight auger located within and a heated jacket surrounding the chamber.

In yet another embodiment, the continuous cooker stretcher comprises a chamber with a heated solid flight auger located therein and a heated jacket surrounding the chamber, wherein the solid flight auger has a fluid chamber, including but not limited to a tube, surrounding the flight. The shaft of the auger is hollow to allow passage of fluid to the fluid chamber surrounding the flight. Any chamber suitable for containment of fluid can be used. In one embodiment, a tube that is easily manipulated and molded may be used.

In another embodiment, the disclosure relates to a continuous cooker stretcher comprising a chamber having an inlet and outlet openings with an auger located therein and a jacket surrounding the chamber, a first fluid reservoir for providing a first heated fluid to the auger, and a second fluid reservoir for providing a second heated fluid to the jacket.

In still another embodiment, the disclosure relates to a continuous cooker stretcher comprising a chamber having an inlet and outlet openings, a flighted auger with a tube coupled to the flight of the auger located within the openings of the chamber, a jacket surrounding the chamber, a first fluid reservoir for providing fluid to the hollow tube coupled to the flighted auger, and a second fluid reservoir for providing fluid to the jacket. In one embodiment, the flights of the auger are solid and the tube coupled to the flights is hollow. In another embodiment, the shaft of the auger is hollow.

In yet another embodiment, the disclosure relates to a continuous cooker stretcher comprising a chamber having an inlet and outlet openings, a flighted auger located within the openings of the chamber, wherein a fluid chamber is coupled to the flights of the auger, a jacket surrounding the chamber, a first fluid reservoir for providing fluid to the fluid chamber of the flighted auger, and a second fluid reservoir for providing fluid to the jacket.

In still another embodiment, the disclosure relates to a continuous cooker stretcher comprising a jacketed chamber having inlet and outlet openings and a flighted auger located between the openings, wherein a hollow tube surrounds the solid auger flights for containment of a heated fluid; a first fluid reservoir for providing a heated first fluid to the tube surrounding the solid flights of the auger; and a second fluid reservoir for providing a second heated fluid to the jacket surrounding the chamber. In one embodiment, the solid flight auger is dual solid flight augers.

In one embodiment, the cheese curd can be continuously added via in the inlet opening of the chamber using a suitable device including, but not limited to, a hopper. The cheese curd is heated as it moves through the interior of the chamber. At least two different sources of heat are provided: (1) an auger with a first heated fluid from a first reservoir and (2) the jacket surrounding the chamber with a second heated fluid from a second reservoir.

The methods and apparatuses disclosed herein can be used with other methods and apparatuses for making cheese including those methods and apparatuses described in U.S. Pat. No. 8,932,657 and U.S. patent application Ser. No. 14/553,464, which are incorporated herein by reference in their entireties.

B. Three Independent Heat Sources

In one embodiment, the continuous cooker stretcher comprises three heat sources: (1) auger members within a chamber with a first heated fluid from a first reservoir passing through said augers; (2) a jacket surrounding a chamber with a second heated fluid from a second reservoir; and (3) steam injectors in the chamber, wherein the first and second reservoir are independent and distinct. These three heat sources are unique to the continuous cooker/stretcher disclosed herein and allow optimized heating of cheese.

In another embodiment, the continuous cooker stretcher comprises a third adjustable heat source provided through direct steam injection, which delivers moisture and lubricity for the cheese as it moves through the interior of the chamber. In one embodiment, the third adjustable heat source is located above the chamber containing the augers.

In one embodiment, the disclosure relates to an apparatus for making cheese comprising: a chamber with an auger located therein, a jacket surrounding said chamber, a first reservoir for providing a first heated fluid to said auger; a second reservoir for providing a second heated fluid to said jacket, and steam injectors for providing steam to the interior of the chamber.

In one embodiment, the disclosure relates to an apparatus for making cheese comprising: a chamber with an auger located therein with a first heated fluid passing through said auger, a jacket surrounding said chamber with a second heated fluid passing through said jacket, wherein the temperature of the first heated fluid is at least 5° F. greater than the temperature of the second heated fluid. In another embodiment, the apparatus comprises a steam injector for providing steam to the interior of the chamber.

In still another embodiment, the disclosure relates to a continuous cooker stretcher comprising a jacketed chamber having an inlet and outlet openings, wherein a flighted auger with a hollow tube coupled to the solid flight of the auger is located within the openings of the chamber, a first fluid reservoir for providing a first fluid to the hollow tube surrounding the solid flights of the auger, and a second fluid reservoir for providing a second fluid to the jacket, and a steam injector for providing steam to the interior of the chamber. In one embodiment, the steam injector is located within a hood above the chamber. In yet another embodiment, the steam injector provides moisture addition and lubricity for the cheese as it moves through the body of the chamber.

In still another embodiment, the disclosure relates to a continuous cooker stretcher comprising a jacketed chamber having an inlet and outlet openings, an auger located within the openings of the chamber, a first fluid reservoir for providing a first fluid to the auger, and a second fluid reservoir for providing a second fluid to the jacket, and a steam injector located with the chamber. In one embodiment, the steam injector is located within a hood above the chamber.

In yet another embodiment, the steam injector provides moisture addition and lubricity for the cheese as it moves through the body of the chamber. Not to be bound by any particular theory, steam supplied to the interior of the chamber provides a small amount of liquid to the cheese curd in the interior of the jacketed chamber. Steam reacts with the cheese curd forming small drops of liquid water and providing lubricity for the cheese as it moves through the interior of the jacketed chamber.

In still another embodiment, the disclosure relates to a continuous cooker stretcher comprising a jacketed chamber having inlet and outlet openings and a pair of flighted augers with a tube surrounding the flight of the auger located therein, wherein plates having direct steam "poppet" valves are located near the top of the chamber; a first fluid reservoir for providing fluid to the tube of the flight auger; and a second fluid reservoir for providing fluid to the jacket surrounding the chamber.

C. Auger

In one embodiment, the augers are solid flight augers. In another embodiment, the auger is a dual auger. In one embodiment, the auger flights are solid. In one embodiment, the auger flights are not hollow. In another embodiment, the shaft of the auger is hollow. In another embodiment, the shaft of the auger is hollow and the flights are solid. In still another embodiment, the auger allows passage of a heated fluid.

In yet another embodiment, the auger has a hollow shaft and solid flights with a hollow fluid chamber coupled to the solid flight. In one embodiment, the fluid chamber is a hollow tube. In another embodiment, the hollow tube is welded to the flight of the auger.

In yet another embodiment, the augers are fitted with a rotary coupling for the supply and return of the heating media. The heating media enters the coupling and flows upward through the hollow center shaft of the auger. The auger features solid flights, which are welded to the center shaft of the auger, and have a hollow tube welded to the perimeter of the auger flights. The heating media that flows through the center shaft enters this perimeter tube and returns through it to the rotary coupling, which circulates it back for reheating. This system allows the solid flight to be heated by both the center shaft as well as the perimeter tubes.

In yet another embodiment, the auger flights have a rounded tube on the edge, which helps prevent cutting of the curd that leads to fat losses.

In another embodiment, the augers rotate from about 6 to 20 revolutions per minute from about 9 to 20 revolutions per minute, from about 12 to 20 revolutions per minute, and from about 15 to 20 revolutions per minute, and from about 18 to 20 revolutions per minute.

In still another embodiment, the augers rotate from about 1, 2, 3, 4, 5, 6, 7, 8, 9, 10, 11, 12, 13, 14, 15, 16, 17, 18, 19, 20, 21, 22, 23, 24, and 25 revolutions per minute.

In one embodiment, the augers rotate from about 3 to 20 revolutions per minute from about 3 to 15 revolutions per minute, from about 3 to 10 revolutions per minute, and from about 3 to 5 revolutions per minute.

D. Heated Fluids

In one embodiment, the fluid supplied to the auger and the fluid supplied to the jacket surrounding the chamber are on separate circuits and the fluids do not interact. This allows the temperature of the fluid supplied to the augers to be independently controlled from the temperature of the fluid supplied to the jacket.

In one embodiment, the fluid supplied to the auger is from a first reservoir and the fluid supplied to the jacket is from a second reservoir, wherein the first and second reservoir are separate and distinct reservoirs.

In yet another embodiment, a central reservoir contains fluid for the auger and the jacket. Fluid for the auger is pumped from the central reservoir to a heating element to obtain the desired temperature and then pumped to the auger. Fluid for the jacket is pumped from the central reservoir to the heating element where it is heated to the desired temperature and then pumped to the jacket. The fluid for the auger has a greater temperature than the fluid for the jacket. After heating, the two fluids are independent of one another; there is no contact between the heated fluid pumped to the auger and the heated fluid pumped to the jacket. Once the temperature of the heated fluid for the auger and the heated fluid for the jacket begins to dissipate, the fluids return to the central reservoir.

In still another embodiment, the fluid supplied to the auger and the fluid supplied to the jacket operate in an independent, non-contact manner. In one embodiment, there is no contact between the fluid supplied to the augers and the fluid supplied to the jacket.

In yet another embodiment, the temperature of the fluid supplied to the augers is independently controlled from the temperature of the fluid supplied to the jacket.

In one embodiment, the temperature of the fluid supplied to the augers is different than the temperature of the fluid supplied to the jacket surrounding the chamber. In one embodiment, the temperature of the fluid supplied to the augers is greater than the temperature of the fluid supplied to the jacket.

In one embodiment, temperature of the heated fluid supplied to the augers is at a different temperature than the temperature of the heated fluid supplied to the jacket. In one embodiment, temperature of heated fluid supplied to the augers is greater than the temperature of the heated fluid supplied to the jacket.

In still another embodiment, the differential between the temperatures of the fluid supplied to the augers and the fluid supplied to the jacket aids in cooking cheese.

In one embodiment, the temperature of the heated fluid supplied to the augers is from about 160 to 195° F., from about 165 to 195° F., from about 175 to 195° F., from about 185 to 195° F., from about 190 to 195° F., from about 190 to 225° F., and from about 225 to 250° F.

In one embodiment, the temperature of the heated fluid supplied to the augers is from about 160 to 190° F., from about 160 to 185° F., from about 160 to 180° F., from about 160 to 175° F., from about 160 to 170° F., and from about 160 to 165° F. One of skill in the art will understand that the temperature will vary depending on the type of cheese.

In yet another embodiment, the temperature of the heated fluid supplied to the augers is from about 165 to 185° F.

In one embodiment, the temperature of the heated fluid supplied to the augers is at least 175° F., or at least 180° F., or at least 185° F.

In still another embodiment, the temperature of the heated fluid supplied to the jacket surrounding the chamber is from about 130 to 170° F., from about 130 to 165° F., from about 130 to 160° F., from about 130 to 155° F., and from about 130 to 150° F., from about 130 to 145° F., from about 130 to 140° F., and from about 130 to 135° F.

In yet another embodiment, the temperature of the heated fluid supplied to the jacket surrounding the chamber is from about 135 to 165° F., from about 140 to 165° F., from about 145 to 165° F., from about 150 to 165° F., and from about 155 to 165° F.

In yet another embodiment, the temperature of the heated fluid supplied to the jacket surrounding the chamber is from at least 145° F., at least 155° F., at least 160° F., and at least 165° F.

In one embodiment, the temperature of the fluid supplied to the augers is greater than the temperature of the fluid supplied to the jacket. In one embodiment, the temperature of the fluid supplied to the augers is at least 5° F., at least 6° F., at least 7° F., at least 8° F., at least 9° F., at least 10° F., at least 11° F., at least 12° F., at least 13° F., at least 14° F., at least 15° F., at least 16° F., at least 17° F., at least 18° F., at least 19° F., at least 20° F., at least 22° F., at least 25° F., at least 30° F., and at least at least 35° F. greater than the temperature of the fluid supplied to the jacket.

In one embodiment, the temperature of the fluid supplied to the augers is from about 5 to 10° F., or about 5 to 15° F., or from about 5 to 20° F., or from about 5 to about 25° F., or from about 5 to about 30° F. greater than the temperature of the fluid supplied to the jacket.

In another embodiment, the heated fluid is water. In one embodiment, the first heated fluid and the second heated fluid are water.

In still another embodiment, the first heated fluid and the second heated fluid can be the same type of fluid or different fluids. In one embodiment, even if both the first heated fluid and the second heated fluid are the same type of fluid, they are obtained from distinct reservoirs and remain independent of one another.

E. One Embodiment of the Cooker Disclosed Herein

Referring now to FIG. 1, a schematic representation of one embodiment of the continuous cooker stretcher 5 is illustrated. The cooker comprises an auger member located within the inlet and outlet openings of the cooker. There is a first fluid reservoir 30 for the fluid that is supplied to the augers. In one embodiment, a first heated fluid from a first reservoir is passed through a hollow shaft of the auger.

In yet another embodiment, a first heated fluid from a first reservoir is passed through a hollow center shaft of the auger and through hollow fluid chambers coupled to the solid flights of the auger.

The lower body is surrounded by a water jacket 10 with an independent temperature control valve.

There is a second fluid reservoir 20 for the fluid supplied to the jacket surrounding the chamber. The water is heated by direct steam injection into a water tank (fluid reservoir) and the water is then circulated by a pump through the water jacket and returns through a gravity flow return line. In one embodiment, the jacket is made of stainless steel including but not limited to 304 or 316 L.

As indicated by FIG. 1, there is no contact between the fluid supplied to the jacket and the fluid supplied to the augers. Distinct and separate reservoirs are used for supplying fluid to the augers and fluid to the jacket. The use of separate fluid reservoirs allows the temperature of the fluids to be independently controlled.

In one embodiment, the continuous cooker stretcher has a Rigitex stainless steel body.

Figure 2:
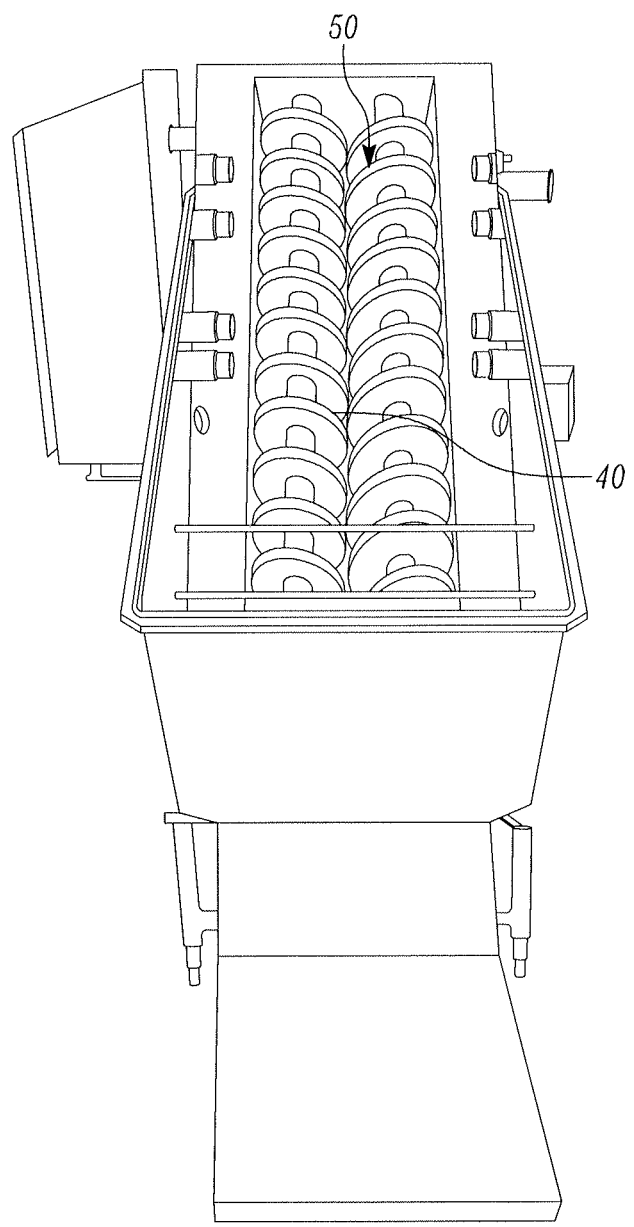
FIG. 2 is a representative depiction of a continuous cooker stretcher with hollow tubes surrounding solid auger flights.

Referring now to FIG. 2, in the body are two, counter rotating augers 40 that are driven by an electric motor through a variable frequency drive. The augers each have a rotary coupling. In one embodiment, the shaft of the auger is hollow.

In one embodiment, heated fluid flows upward through the shaft and back down tubes 50 welded to the perimeter of the auger flights (see FIG. 2). A pump draws fluid from a second fluid reservoir and circulates to the rotary coupling and thereby through the tubes of the augers. The fluid is heated through direct steam injection into a fluid reservoir.

The augers are fitted with a rotary coupling for the supply and return of the heating media. The heating media enters the coupling and flows upward through the hollow center shaft of the auger. The auger features solid flights, which are welded to the center shaft of the auger, and have a hollow tube welded to the perimeter of the auger flights. The heating media that flows through the center shaft enters this perimeter tube and returns through it to the rotary coupling, which circulates it back for reheating. This system allows the solid flight to be heated by both the center shaft as well as the perimeter tubes.

In yet another embodiment, the auger flights have a rounded tube on the edge, which helps prevent cutting of the curd that leads to fat losses.

In one embodiment, the auger is made of stainless steel including but not limited to 304 or 316L.

In one embodiment, positioned within the chamber are twin augers having helical vanes passing in helixes of opposite "hand" around shafts so that the vanes may intermesh while the shafts turn in opposite directions. A motor turns the augers through a conventional gear drive as will be understood to those of ordinary skill in the art. The augers so turning provide a generally upward motion to the mixture of the pasta filata cheese through the chamber.

In one embodiment, the clearance between the vanes and the walls of the chamber and the pitch and speed of the augers is adjusted so that the cheese is stretched and folded between the augers and the inside of the chamber without cutting, so that the fibers of the cheese are preserved.

Generally, the augers provide a similar action to hand kneading in which the palm of the hand is pressed against a lump of dough of cheese to roll it along a hard surface, stretching and compressing the cheese back upon itself.

At the upper end of the chamber is an exit opening through which the cheese exits as a reduced and low-fat pasta filata cheese.

In one embodiment, the continuous cooker stretcher is generally instrumented and controlled through a control panel providing control for the speed of the metering pump of the motors and of valves necessary to hold the temperatures of the water jacket and augers, and within the range as described.

In another embodiment, the heated fluid may be provided by a steam heat exchanger.

In still another embodiment, the continuous cooker stretcher may comprise plates to close off the top of the machine and to assist in the mixing and stretching of the curd. In one embodiment, the plates are removable. In another embodiment, a series of removable bars are used to secure the plates.

In one embodiment, the continuous cooker stretcher has 1, 2, 3, 4, 5, 6, 7, 8, 9, or 10 plates.

In one embodiment, the plates feature "domes," which contain direct steam "poppet" valves. These valves are fed direct steam after it has passed through a culinary steam filter to provide additional heat to the cheese.

In one embodiment, the body of the continuous cooker stretcher is angled upward toward the discharge ferrule. The body is a constant width along the length of the augers and then tapers to an 8" diameter Tri-Clamp ferrule. At the end of the plates at the inlet end is a removable baffle along with the back part of the body, which acts as a hopper to receive the curd.

II. Methods of Making Pasta Filata Cheese with a Continuous Cooker Stretcher

In one embodiment, the disclosure relates to a method of making a pasta filata cheese by processing a traditional curd using a continuous cooker stretcher. The methods disclosed herein can be used to produce any of the traditional cheeses broadly described as pasta filata cheeses. The cheeses made by the methods disclosed herein will replicate the flavor, functionality and appearance of traditional cheeses of these types. The ability to achieve a cheese with the characteristics of these traditional cheeses using a continuous cooker stretcher provides distinct economic advantages over producing traditional mozzarella in the conventional manner.

In one embodiment, the disclosure relates to a method comprising: passing a first heated fluid from a first reservoir through an auger located within a chamber; passing a second heated fluid from a second reservoir through a jacket surrounding the chamber, wherein the first and second reservoirs are distinct reservoirs. In one embodiment, the shaft of the auger is hollow.

In one embodiment, the disclosure relates to a method comprising: cooking cheese curd in a jacketed chamber by rotating auger members, wherein a first heated fluid from a first reservoir passes through said auger members, and a second heated fluid from a second reservoir passes through said jacket, and further wherein the temperature of the first heated fluid is at least 5° F. greater than the temperature of the second heated fluid.

In yet another embodiment, the disclosure relates to a method comprising: (a) supplying cheese curd to an interior of a jacketed chamber with an auger; wherein a first heated fluid from a first reservoir passes through the auger and a second heated fluid from a second reservoir passes through the jacket surrounding the chamber, and further wherein the first and second reservoirs are distinct; and (b) rotating the pair of auger members to knead and melt the cheese curd. In another embodiment, the method comprises supplying steam or mist to the cheese curd in the chamber. In another embodiment, the steam is supplied by a hood above the chamber.

In one embodiment, the disclosure relates to a method comprising: (a) providing a chamber having an inlet and outlet openings and an auger located between the inlet and outlet openings, wherein a jacket surrounds the chamber; (b) passing a first heated fluid from a first reservoir through the auger and passing a second heated fluid from a second reservoir through the jacket surrounding the chamber, wherein the first and second reservoirs are independent and distinct; (c) supplying cheese curd to the interior of the jacketed chamber via the inlet opening; and (d) rotating the pair of auger members to knead and melt the cheese curd. In another embodiment, the auger comprises a hollow shaft and a hollow fluid chamber coupled to solid flights of the auger.

In still another embodiment, the method further comprises supplying steam to the interior of the chamber to provide lubricity to the cheese curd within said chamber.

In one embodiment, the disclosure relates to a method comprising: (a) providing a chamber having an inlet and outlet openings and a pair of solid flight auger members located between the inlet and outlet openings, wherein a jacket surrounds the chamber and further wherein a hollow tube is coupled to the flight of the augers; (b) passing a first heated fluid from a first reservoir through a hollow auger shaft and the hollow tube of the flight of the augers and passing a second heated fluid from a second reservoir through the jacket surrounding the chamber, wherein the first and second reservoirs are independent and distinct; (c) supplying cheese curd to the interior of the jacketed chamber via the inlet opening; and (d) rotating the pair of auger members to knead and melt the cheese curd. In another embodiment, the method comprises removing the low moisture filata cheese from the jacketed chamber via the outlet opening. In one embodiment, the hollow tube can be welded to the solid flight augers.

In one embodiment, the disclosure relates to a method comprising: (a) providing a chamber having an inlet and outlet openings and a pair of solid flight auger members located between the inlet and outlet openings, wherein a jacket surrounds the chamber and further wherein a hollow fluid chamber surrounds the solid flight augers; (b) passing a first heated fluid from a first reservoir through the hollow fluid chamber of the solid flight of the augers and a second heated fluid from a second reservoir through the jacket surrounding the chamber; (c) supplying cheese curd to the interior of the jacketed chamber via the inlet opening; (d) rotating the pair of auger members to knead and melt the cheese curd; and (e) providing steam to the cheese curd as it moves through the chamber.

In one embodiment, the method further comprises providing steam to the interior of the chamber. In one embodiment, steam is provided by steam valves located in a plate above the chamber. In one embodiment, the valves are direct-fed steam after the steam has passed through a culinary steam filter.

In one embodiment, the fluid to the jacket is supplied through the bottom of the jacket surrounding the chamber and exits through the top of the jacket surrounding the chamber.

In one embodiment, the methods disclosed herein will obtain better solids retention and increased product yield as compared to traditional methods of making pasta filata. In one embodiment, the methods disclosed herein will obtain better solids retention and increased product yield ranging from about 0.1% by weight to about 0.5% by weight as compared to traditional methods of making pasta filata. Throughout this description, all percentages are by weight, unless otherwise specified.

In one embodiment, the methods disclosed herein will obtain better solids retention and increased product yield ranging from about 0.5% by weight to about 2% by weight as compared to traditional methods of making pasta filata.

In one embodiment, the methods disclosed herein will obtain better solids retention and increased product yield ranging from about 0.75% by weight to about 3% by weight as compared to traditional methods of making pasta filata.

In one embodiment, the methods disclosed herein will obtain better solids retention and increased product yield ranging from about 1% by weight to about 4% by weight as compared to traditional methods of making pasta filata.

In one embodiment, the methods disclosed herein will increase solids retention and product yield in excess of about 0.2% by weight as compared to traditional methods of making pasta filata.

In one embodiment, the methods disclosed herein will obtain better solids retention and increased product yield in excess of about 0.5% by weight as compared to traditional methods of making pasta filata.

In one embodiment, the methods disclosed herein will obtain better solids retention and increased product yield in excess of about 1% by weight as compared to traditional methods of making pasta filata.

Not wishing to be bound by any particular theory, the methods disclosed herein increase solids retention at least in part because the material is not cooked in water and thus, there is no waste stream created.

III. System for Making Pasta Filata Cheese

A. Cyclone

A system for producing pasta filata cheese is disclosed. A cyclone is used to receive cheese curds. In one embodiment, the cheese curds are transported to the cyclone through a tubular structure. The cyclone can be made of any suitable material including, but not limited to, stainless steel.

B. Curd Mill

In one embodiment, the cheese curd moves from the cyclone to a curd mill. However, a curd mill is not required for in every system.

A curd mill may be used to reduce the size of the curd exiting the cyclone. In another embodiment, the curd may be milled prior to being transported to the cyclone. In still another embodiment, a method known as "stirred curd" may be implemented whereby curds are continuously stirred on the whey draining machine so that milling is not required.

In one embodiment, the curd mill 25 cuts the cheese to a pre-determined and desired size. Representative sizes include but are not limited to ⅜"×⅜"×4"; ¾"×¾"×2" and many other sizes.

C. Conveyance System

The cheese curd leaves the curd mill and is placed on a mechanical belt system. In one embodiment, cheese curd from the curd mill is deposited onto a section of the conveyor belt, designed to give the curd mass a specific width, length, and height. This conveyor belt may have cleats across its width and may have elevated sides to contain the curd.

In one embodiment, the system can include at least one conveyance system for transporting the articles through one or more of the processing zones described herein. Examples of suitable conveyance systems can include, but are not limited to, plastic or rubber belt conveyors, chain conveyors, roller conveyors, flexible or multi-flexing conveyors, wire mesh conveyors, bucket conveyors, pneumatic conveyors, screw conveyors, trough or vibrating conveyors, and combinations thereof. The conveyance system can include any number of individual convey lines and can be arranged in any suitable manner within the process vessels. The conveyance system can be configured in a generally fixed position within the vessel or at least a portion of the system can be adjustable in a lateral or vertical direction.

The mechanical belt system is used to transport the cheese from one station to the next station in the system. The cheese curd can be transported on the belt at a rate selected from the group consisting of: 5-10 in/min, 10-15 in/min, 15-20 in/min, 20-25 in/min, 25-30 in/min, 30-35 in/min, 35-40 in/min, 40-45 in/min, 45-50 in/min, 50-55 in/min, 55-60 in/min, 60-65 in/min, 65-70 in/min, 70-75 in/min, 75-80 in/min, 80-85 in/min, 85-90 in/min, 90-95 in/min, 95-100 in/min and greater than 100 in/min (see discussion above for complete range).

D. Ingredient Dispenser

The mechanical belt transports the cheese curd from the mill to an ingredient dispenser. Various ingredients known to the cheese-making art may be added to achieve the optimum characteristics in the final cheese. Examples of such ingredients include, but are not limited to, non-fat dry milk, anhydrous milk fat, milk protein concentrate, concentrated milk fat, emulsifier, salt, water, and other ingredients as allowed by current or future standards, and mixtures thereof. For example, addition of non-fat dry milk solids lowers the fat content of the cheese, based on the desired specifications of the finished cheese. Adding non-fat dry milk solids is one way to standardize the fat content of the cheese and to capture more of the nonfat solids. The cheese curd takes up re-hydrated nonfat dry milk more easily and the final cheese avoids watering-off. The fat and water content of the incoming cheese and of the desired final cheese determine the amounts of such ingredients to be added. Often, these ingredients may be functionally interchangeable, and the particular added ingredient may vary according to the desired characteristics of the cheese product and according to the market availability and cost of these ingredients.

If desired, a suitable emulsifier may be added to the curd before it is cooked in the continuous cooker stretcher system. In another embodiment, the emulsifier may be added prior to entering the continuous cooker stretcher system, after exiting the continuous cooker stretcher system or before entering the continuous cooker stretcher system and after exiting the continuous cooker stretcher system.

Non-limiting examples of suitable emulsifiers include sodium citrate and sodium phosphate, in amounts of between less than about 0.5% to about 3% (the maximum amount allowed by law). If the curd has the correct fat and moisture content when introduced into the continuous cooker stretcher system, an emulsifier is generally unnecessary. However, to meet certain customer needs, it may be desirable to adjust the moisture or add additional ingredients to the cheese. In addition, an emulsifier avoids watering-off of the mozzarella, by allowing absorption of added water. When an emulsifier, such as sodium citrate, is added, it is preferably added in a level under 0.5%.

Traditional mozzarella preparation typically uses thermophilic cultures and such cultures may be used in the methods disclosed herein.

Additional examples of ingredients include, but are not limited to, acidity regulator, an acid, an anticaking agent, an antifoaming agent, a coloring agent, an emulsifier, an enzyme preparation, a flavoring agent, a finning agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral. Examples may further include procream, whey cream, a dairy solid, and foodstuffs of vegetable, fruit and/or animal source. The foodstuffs may include fruit, vegetables, nuts, meat, and spices, among other foodstuffs.

Acidity regulators, anticaking agents and firming agents of various types can be included in the soft or firm/semi-hard ripened or unripened blended cheese. Typically, these agents are inorganic salts, but other types of acidity regulators, anticaking agents and firming agents can also be used. Examples of suitable acidity regulators, anticaking agents and firming agents may include calcium chloride, tricalcium phosphate, and calcium hydroxide, powdered cellulose, disodium phosphate and potassium hydroxide. These agents are typically added as part of a solution, either by incorporation in the slurry or as a liquid. But they can also be added as a powder that is incorporated, for example, into the admixture of the slurry and heated cheese mass at the mixing stage.

The total amount of acidity regulators, anticaking agents and firming agents incorporated is sufficient so the concentration of the acidity regulators, anticaking agents and firming agents in the final cheese product is generally up to about 0.01, 0.5, or 3.0% by weight. More specifically, the amount of acidity regulators, anticaking agents and firming agents can range from about 0.05-3.0%, from about 0.1-2.5%, or from about 0.5-2.0% by weight. This means that the concentration of the acidity regulators, anticaking agents and firming agents in the slurry is typically about 0.01-3.2 wt. %.

A number of different sequestrants can be incorporated into the final cheese product. Sequestrants that can be utilized include, but are not limited to, various phosphate salts (e.g., sodium hexametaphosphate, monosodium phosphate, sodium tripolyphosphate, disodium phosphate, and potassium phosphate), calcium citrate, trisodium citrate, calcium gluconate, oxystearin and sorbitol.

The total amount of sequestrant is usually up to about 0.1, 1, or 4% by weight of the final cheese product. So, for example, the amount of sequestrant in the final cheese product can range from about 0.1 to 4%, from about 0.25 to 3.0%, or from about 0.4 to 2.5% by weight. The concentration of the sequestrants in the slurry itself is typically about 0.1 to about 12% by weight of the slurry.

An acidic agent (an acid) can be incorporated to adjust the pH of the finished cheese to a desired level. The acidity of the cheese can be controlled to help regulate the melt down characteristics of the finished cheese. Various acids can be employed; examples of suitable acids include, but are not limited to, adipic acid, lactic acid, hydrochloric acid, acetic acid, glucano delta lactone, phosphoric acid, lactobionic acid or Genlac C, the latter being a blend of water, citric acid, lactic acid, acetic acid and artificial flavors. Acid is typically added to adjust the pH of the finished cheese until a pH from about 5-6 is reached, and more typically from a pH 5.10-5.90.

A colorant can be incorporated into the soft or firm/semi-hard ripened or unripened blended cheese to adjust its natural color. This can be useful, for example, if consumers have a preference for a color other than the naturally-occurring color. Examples of suitable colorants include annatto, tumeric, titanium dioxide, and beta-carotene. Colorants may be of both the natural or artificial color. If one wished to color the cheese a red, an artificial color such as FD&C red #40 can be used. Annatto is useful to give mozzarella cheese the appearance of cheddar. This allows one to produce a cheese for pizza baking that has the desired melt characteristics of mozzarella, but with a different appearance than that of traditional white mozzarella. Annatto-colored mozzarella can be used as a replacement for cheddar cheese in many food products (e.g., Mexican-style prepared foods). Tumeric imparts a yellowish color to cheese. The yellowish color often is preferred by consumers who perceive it to indicate a "richer" product upon cooking on a pizza. Colorants such as annatto and tumeric can be obtained, for example, from Chris Hansens Labs of Milwaukee, Wis.

Various flavoring agents can also be incorporated into the cheese to tailor the flavor profile of the cheese to meet consumer preferences. Suitable flavors for mixing into the heated cheese include, for example, cheddar cheese flavor and parmesan cheese flavor. Flavoring agents are typically added in an amount such that the concentration in the final cheese product is within the range of about 0.01 to 5 wt. %. If incorporated into the slurry, the concentration of the flavoring agent in the slurry is generally is in the range of about 0.11-4.50 wt. %.

E. Continuous Cooker Stretcher

The mechanical belt system transports the cheese curd from the ingredient dispenser to the continuous cooker stretcher discussed in Section I.

D. Clean-In-Place System

Finally, the mechanical belt is cleaned by a Clean-In-Place system, which contains various detergents and agents for removing any residual cheese pieces. After the belt is exposed to the detergents, at least one rinse is performed with clean water to ensure no detergents remain on the belt. One of ordinary skill in the art will understand how to optimize and customize the Clean-In-Place system to ensure that residual cheese flakes and/or parts are removed and at the same time, no residual detergent remains on the belt.

IV. General Procedure for Production of Cheese Curd

A general and representative procedure for the production of cheese curd is provided below. The information below is not intended to limit the scope of the application in any manner.

Starting from cow's milk or buffalo milk, or mixed milk having a 0-10% fat content and 2.5-5% protein content, after filtration, the milk is optionally pasteurized following usual procedures or submitted to ultrafiltration, microfiltration and other similar procedures. Once the milk source characteristics have been determined, the milk is brought to a temperature of 33°-37° F. Then the addition of cultures of bacteric and/or selected ferments is carried out, which operation generally takes place 20-30 minutes before the addition of rennet so as to give the milk a mass of very active microorganisms that can give fermentation the desired orientation at once.

Generally, cultures of bacteria mainly consisting of *Streptococcus thermophilus* and a minor part of *Lactobacillus helvetitus* or *Lactobacillus bulgaricus* are used. The acidity of said bacteria cultures added to the milk at the rate of 2-3%, ranges from 14° to 24° SH/50 ml. It is; however, also possible to act in such a manner that the acidifying action carried out by milk ferments is replaced by the addition of organic acids to the milk. This addition must take place in such a way to avoid concentration gradients that can give rise to the formation of flocculations. It is therefore suitable to undertake a slow addition of acids suitably diluted in water to the milk remaining under constant and quick stirring. Acetic acid or citric acid may be considered as appropriate and the pH value ranges from 5.5 to 5.8.

Next, to the milk thus obtained, rennet of various titre and characteristics and in variable doses is then added. Curdling takes place at a temperature of about 33°-37° F., it requires a period of time of about 45 minutes and enables a soft but elastic curd to be achieved. In any case, rennet amount and curdling temperature and time may vary depending on the milk characteristics and on the particular features to be achieved in the finished product.

After the soft gel (curd) hardening step, the curd can be cut. The first cutting together with a short rest (5 to 10 minutes) enables the whey drain off to start. Then there is a second cutting. The final result is a curd suspension consisting of grains of variable size depending upon the desired final product. Eventually, the curd may be allowed to settle on the cheese vat bottom in order to enable it "to build itself up" and start ripening. Depending on the type of vat, the curd may be continuously stirred to prevent the curd from combining into large lumps.

The methods and apparatuses disclosed herein are further described by the following paragraphs:

1. An apparatus comprising a chamber with a heated auger located therein and a heated jacket surrounding the chamber, wherein the heat source for the auger and the heat source for the chamber are separate and distinct and operate independent of one another.

2. An apparatus comprising a chamber having an inlet and outlet openings, wherein an auger is located within the chamber and a jacket surrounds the chamber, a first fluid reservoir for providing fluid to the auger, and a second fluid reservoir for providing fluid to the jacket.

3. An apparatus comprising a chamber having an inlet and outlet openings, wherein a flighted auger with a tube surrounding the flight of the auger is located within the openings of the chamber, and further wherein a jacket surrounds the chamber, a first fluid reservoir for providing fluid to the tube of the flighted auger, and a second fluid reservoir for providing fluid to the jacket.

4. An apparatus comprising a jacketed chamber having inlet and outlet openings, wherein a flighted auger with a tube surrounding the flight of the auger is located within the openings of the chamber; a first fluid reservoir for providing a first fluid to the tube surrounding the auger; a second fluid reservoir for providing a second fluid to the jacket, and a steam injector located with the chamber.

5. The apparatus of any of the preceding paragraphs, wherein the steam injector is located within a hood above the chamber.

6. The apparatus of any of the preceding paragraphs, wherein the fluid supplied to the auger and the fluid supplied to the jacket surrounding the chamber are on separate circuits and the fluids do not interact.

7. The apparatus of any of the preceding paragraphs, wherein the temperature of the fluid supplied to the augers is independently controlled from the temperature of the fluid supplied to the jacket.

8. The apparatus of any of the preceding paragraphs, wherein the temperature of the fluid supplied to the augers is different than the temperature of the fluid supplied to the jacket surrounding the chamber.

9. The apparatus of any of the preceding paragraphs, wherein the temperature of the fluid supplied to the augers is greater than the temperature of the fluid supplied to the jacket.

10. A method comprising:
    (a) providing a chamber having inlet and outlet openings and a pair of auger members located between the inlet and outlet openings, wherein a jacket surrounds the chamber; (b) passing a first heated fluid through the jacket of the chamber and a second heated fluid through the augers; (c) supplying cheese curd to the interior of the jacketed chamber via the inlet opening; and (d) rotating the pair of auger members to knead and melt the cheese curd.

11. A method comprising: (a) providing a jacketed chamber having inlet and outlet openings and a pair of solid flight augers located between the inlet and outlet openings, wherein a tube surrounds the flight of the augers; (b) passing a first heated fluid through the jacket of the chamber and a second heated fluid through the tube surrounding the flight of the augers; (c) supplying cheese curd to the interior of the jacketed chamber via the inlet opening therein; and (d) rotating the pair of auger members to knead and melt the cheese curd.

12. A method comprising: (a) providing a chamber having inlet and outlet openings and a pair of solid flight auger members located between the inlet and outlet openings, wherein a jacket surrounds the chamber and further wherein a tube surrounds the flight of the augers; (b) passing a first heated fluid from a first reservoir through the jacket surrounding the chamber and a second heated fluid from a second reservoir through the tube of the flight of the augers, wherein the first and second reservoirs are independent and distinct; (c) supplying cheese curd to the interior of the jacketed chamber via the inlet opening; and (d) rotating the pair of auger members to knead and melt the cheese curd.

13. A method comprising: (a) providing a chamber having an inlet and outlet openings and a pair of solid flight auger members located between the inlet and outlet openings, wherein a jacket surrounds the chamber and further wherein a tube surrounds the flight of the augers; (b) passing a first heated fluid from a first reservoir through the jacket surrounding the chamber and a second heated fluid from a second reservoir through the tube of the flight of the augers; (c) supplying cheese curd to the interior of the jacketed chamber via the inlet opening; (d) rotating the pair of auger members to knead and melt the cheese curd; and (e) providing steam to the cheese curd as it moves through the chamber.

14. A cooker comprising a chamber with an auger having a first heated fluid; steam injectors for supplying steam to the interior of the chamber; and a jacket surrounding the chamber with a second heated fluid.

15. An apparatus for making pasta filata cheese comprising a chamber with a flighted auger located therein, wherein the auger has a hollow shaft and a hollow fluid chamber coupled to solid flights, a jacket surrounding the chamber, a first reservoir for providing a first heated fluid to the auger; and a second reservoir for providing a second heated fluid to the jacket; wherein the first and second reservoirs are distinct reservoirs.

16. An apparatus/cooker of any of the preceding paragraphs wherein the chamber has inlet and outlet openings with an auger located between the inlet and outlet openings.

17. An apparatus/cooker of any of the preceding paragraphs wherein the chamber has a hollow interior for accepting cheese curd, and further wherein the cheese curd is heated as it moves through the interior of the chamber.

18. An apparatus for making pasta filata cheese comprising a chamber with a flighted auger located therein, wherein the auger has a hollow shaft and a hollow fluid chamber coupled to solid flights, a jacket surrounding the chamber, a first reservoir for providing a first heated fluid to the auger; and a second reservoir for providing a second heated fluid to the jacket; wherein the first and second reservoirs are distinct reservoirs.

19. The apparatus/cooker/methods of any of the preceding paragraphs, wherein the first heated fluid is at least 5° F. greater than the temperature of the second heated fluid 20. The apparatus/cooker/methods of any of the preceding paragraphs, wherein the chamber further comprises a steam injector for providing steam to the interior of the chamber.

21. The apparatus/cooker/methods of any of the preceding paragraphs, wherein the fluid chamber is a hollow tube welded to the solid flights of the auger.

22. The apparatus/cooker/methods of any of the preceding paragraphs, wherein the first heated fluid is at least 170° F.

23. The apparatus/cooker/methods of any of the preceding paragraphs, wherein the second heated fluid is at least 160° F.

24. The apparatus/cooker/methods of any of the preceding paragraphs, wherein the hollow tube has rounded edges.

25. A cooker comprising a chamber with an auger located therein; steam injectors for supplying steam to the interior of the chamber; a jacket surrounding the chamber; a first reservoir for providing a first heated fluid to the auger; and a second reservoir for supplying a second heated fluid to the jacket, wherein the first and second reservoirs are distinct reservoirs.

26. A cooker comprising a chamber with an auger located therein; a jacket surrounding the chamber; a first reservoir for providing a first heated fluid to the auger; and a second reservoir for supplying a second heated fluid to the jacket, wherein the first and second reservoirs are distinct reservoirs.

27. The apparatus/cooker/methods of any of the preceding paragraphs, wherein the first heated fluid is at least 5° F. greater than the temperature of the second heated fluid.

28. The apparatus/cooker/methods of any of the preceding paragraphs, further comprising a steam injector for supplying steam to the interior of the chamber.

29. The apparatus/cooker/methods of any of the preceding paragraphs, wherein the auger has solid flights, which are welded to a center shaft of the auger, and have a hollow fluid chamber welded to the perimeter of the auger flights.

30. The apparatus/cooker/methods of any of the preceding paragraphs, wherein the steam injector is located within a hood above the chamber.

31. The apparatus/cooker/methods of any of the preceding paragraphs, wherein the temperature of the first fluid supplied to the augers is independently controlled from the temperature of the second fluid supplied to the jacket.

32. The apparatus/cooker/methods of any of the preceding paragraphs, wherein the temperature of the first fluid supplied to the augers is different than the temperature of the second fluid supplied to the jacket surrounding the chamber.

33. A method for making pasta filata cheese comprising: passing a first heated fluid from a first reservoir through a pair of auger members located in a chamber; passing a second heated fluid from a second reservoir through a jacket surrounding the chamber, wherein the first and second reservoirs are distinct reservoirs; and rotating the pair of auger members to knead and melt cheese curd in the interior of the chamber.

34. The apparatus/cooker/methods of any of the preceding paragraphs, further comprising applying steam to the cheese curd in the chamber.

35. The apparatus/cooker/methods of any of the preceding paragraphs, wherein the auger members have solid flights, which are welded to a center shaft of the auger, and have a hollow fluid chamber welded to the perimeter of the auger flights.

36. The apparatus/cooker/methods of any of the preceding paragraphs, wherein the first heated fluid has a temperature at least 5° F. greater than the temperature of the second heated fluid.

37. The apparatus/cooker/methods of any of the preceding paragraphs, wherein the first heated fluid is at least 175° F.

38. The apparatus/cooker/methods of any of the preceding paragraphs, wherein the second heated fluid is at least 160° F.

39. A method comprising: providing a jacketed chamber having inlet and outlet openings and a pair of auger members located between the inlet and outlet openings; passing a first heated fluid from a first reservoir through the augers and a second heated fluid from a second reservoir through the jacket surrounding the chamber; wherein the first and second reservoirs are distinct reservoirs; supplying cheese curd to the interior of the jacketed chamber via the inlet opening; and rotating the pair of auger members to knead and melt the cheese curd.

40. The apparatus/cooker/methods of any of the preceding paragraphs, wherein the auger members have solid flights, which are welded to a center shaft of the auger, and have a hollow fluid chamber welded to the perimeter of the auger flights.

41. The apparatus/cooker/methods of any of the preceding paragraphs, wherein the first heated fluid has a temperature at least 5° F. greater than the temperature of the second heated fluid.

42. The apparatus/cooker/methods of any of the preceding paragraphs, wherein the first heated fluid is at least 175° F.

43. The apparatus/cooker/methods of any of the preceding paragraphs, wherein the second heated fluid is at least 160° F.

44. The apparatus/cooker/methods of any of the preceding paragraphs, further comprising applying steam to the cheese curd in the chamber.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations that operate according to the principles of the invention as described. Therefore, it is intended that this invention be limited only by the claims and the equivalents thereof. The disclosures of patents, references and publications cited in the application are incorporated by reference herein.

What is claimed is:

1. An apparatus for making pasta filata cheese, comprising:
    an auger positioned within a chamber, the auger comprising flights positioned around a hollow shaft, the flights comprising flight edges;
    a hollow fluid tube coupled to and extending continuously around each of the flight edges, the hollow fluid tube in fluidic communication with the hollow shaft, the hollow fluid tube comprising rounded edges extending continuously around the hollow fluid tube;
    a jacket surrounding the chamber;
    a first reservoir configured to provide a first heated fluid at a first temperature to the hollow shaft and the hollow fluid tube; and
    a second reservoir configured to provide a second heated fluid at a second temperature to the jacket;
    wherein the first and second reservoirs are distinct reservoirs.

2. The apparatus of claim 1, wherein the first and second reservoirs are configured to provide the first heated fluid at the first temperature of at least 5° F. greater than the second temperature of the second heated fluid.

3. The apparatus of claim 1, further comprising a steam injector configured to provide steam to the interior of the chamber.

4. The apparatus of claim 1, wherein the hollow fluid tube is welded to the flight edges.

5. The apparatus of claim 1, wherein the first reservoir is configured to provide the first heated fluid at a first temperature of at least 170° F.

6. The apparatus of claim 1, wherein the second reservoir is configured to provide the second heated fluid at a second temperature of at least 160° F.

7. The apparatus of claim 1, wherein the first reservoir is configured to provide the first heated fluid to the hollow shaft, and the hollow shaft is configured to provide the first heated fluid to the hollow fluid tube.

8. The apparatus of claim 1, wherein the auger is one of a pair of counter rotating augers.

9. The apparatus of claim 1, wherein the hollow shaft and the hollow fluid tube are configured to return the first heated fluid to the first reservoir, and wherein the jacket is configured to return the second heated fluid to the second reservoir.

* * * * *